United States Patent
Hagihara

(10) Patent No.: US 9,151,334 B2
(45) Date of Patent: Oct. 6, 2015

(54) FRICTION MEMBER, CLUTCH PLATE, CLUTCH DEVICE AND TORQUE CONVERTER

(75) Inventor: Yoshiyuki Hagihara, Nishinomiya (JP)

(73) Assignee: EXEDY CORPORATION, Osaka (JP)

( * ) Notice: Subject to any disclaimer, the term of this patent is extended or adjusted under 35 U.S.C. 154(b) by 0 days.

(21) Appl. No.: 14/007,528

(22) PCT Filed: Mar. 22, 2012

(86) PCT No.: PCT/JP2012/057351
§ 371 (c)(1),
(2), (4) Date: Sep. 25, 2013

(87) PCT Pub. No.: WO2012/147433
PCT Pub. Date: Nov. 1, 2012

(65) Prior Publication Data
US 2014/0014461 A1    Jan. 16, 2014

(30) Foreign Application Priority Data
Apr. 25, 2011   (JP) .................................. 2011-097397

(51) Int. Cl.
*F16H 45/02*   (2006.01)
*F16D 13/64*   (2006.01)
*F16D 69/00*   (2006.01)

(52) U.S. Cl.
CPC ................ *F16D 13/64* (2013.01); *F16H 45/02* (2013.01); *F16D 2069/004* (2013.01); *F16H 2045/0205* (2013.01); *F16H 2045/0221* (2013.01); *F16H 2045/0284* (2013.01); *F16H 2045/0289* (2013.01)

(58) Field of Classification Search
USPC ........................................................ 192/113.36
See application file for complete search history.

(56) References Cited

U.S. PATENT DOCUMENTS

| | | | | |
|---|---|---|---|---|
| 3,999,634 A | * | 12/1976 | Howell | 188/71.6 |
| 5,460,255 A | | 10/1995 | Quigley | |
| 5,669,474 A | * | 9/1997 | Dehrmann et al. | 192/3.29 |
| 5,671,835 A | | 9/1997 | Tanaka et al. | |
| 6,000,510 A | * | 12/1999 | Kirkwood et al. | 192/3.29 |
| 6,247,568 B1 | | 6/2001 | Takashima et al. | |

(Continued)

FOREIGN PATENT DOCUMENTS

| | | |
|---|---|---|
| JP | 06-300051 A | 10/1994 |
| JP | 08-135676 A | 5/1996 |

(Continued)

*Primary Examiner* — Ramya Burgess
*Assistant Examiner* — Mark Manley
(74) *Attorney, Agent, or Firm* — Global IP Counselors, LLP

(57) ABSTRACT

A friction member to be used for a lock-up clutch device includes a plurality of friction portions and a plurality of grooves. The plural friction portions are disposed in alignment in a circumferential direction. The plural grooves are formed between or among the plural friction portions and penetrate therebetween or thereamong from the inner peripheral side to the outer peripheral side. Further, each of the plural grooves includes an inner peripheral groove and an outer peripheral groove. The inner peripheral groove is formed in a V-shape, and includes a first groove that is disposed on the inner peripheral side and has an opening, and a second groove that is disposed on the outer peripheral side and continues to the first groove. The outer peripheral groove continues to the outer peripheral end of the second groove of the inner peripheral groove, and radially extends in the outer peripheral direction.

4 Claims, 3 Drawing Sheets

(56) References Cited

U.S. PATENT DOCUMENTS

| | | | |
|---|---|---|---|
| 6,454,072 B1 * | 9/2002 | Merkel et al. | 192/70.12 |
| 6,711,895 B1 * | 3/2004 | Miura et al. | 60/345 |
| 2003/0230463 A1 * | 12/2003 | Fabricius et al. | 192/113.36 |
| 2005/0109576 A1 * | 5/2005 | Kitahara et al. | 192/113.36 |

FOREIGN PATENT DOCUMENTS

| | | |
|---|---|---|
| JP | 2000-266079 A | 9/2000 |
| JP | 2005-351296 A | 12/2005 |

* cited by examiner

FRICTION MEMBER, CLUTCH PLATE, CLUTCH DEVICE AND TORQUE CONVERTER

CROSS-REFERENCE TO THE RELATED APPLICATIONS

This U.S. national phase application claims priority to Japanese Patent Application No. 2011-097397 filed on Apr. 25, 2011. The entire disclosure of Japanese Patent Application No. 2011-097397 is hereby incorporated herein by reference

TECHNICAL FIELD

The present invention relates to a friction member having an annular friction surface.

The present invention according to another aspect relates to a clutch plate including an annular core plate and the friction member.

The present invention according to yet another aspect relates to a clutch device to be disposed between an input-side rotor and an output-side rotor.

The present invention according to yet another aspect relates to a torque converter for transmitting torque from the input rotor to the output rotor by fluid.

BACKGROUND ART

A torque converter is a device for transmitting torque from an engine to a transmission by fluid. The torque converter mainly includes: a front cover to which the torque from the engine is inputted; and components for forming a torus, i.e., an impeller, a turbine and a stator. Further, the torque converter includes a lock-up clutch device disposed axially between the front cover and the turbine.

The lock-up clutch device is a device for directly transmitting torque from the front cover to the turbine. As a type of the lock-up clutch device, a multi-plate type device has been provided that includes a plurality of clutch plates for increasing the capacity of transmitting torque. Here, the clutch plates are disposed on a front cover side (an input side) and a turbine side (an output side). Further, the clutch plates are configured to be press-contacted to each other by a piston configured to be actuated by hydraulic pressure. Accordingly, a clutch-on (torque transmission) state is produced.

The clutch plates are composed of: a plate to which friction members are fixed; and a plate to which no friction member is fixed. In general, the plate to which the friction member is fixed includes an annular core plate and friction members fixed to the both surfaces of the core plate. Further, as described in PTL 1, for lubrication and cooling and for reducing drag torque, a plurality of grooves are formed on the friction surface of each friction member so as to be extending from the inner periphery to the outer periphery.

CITATION LIST

Patent Literature

PTL 1: Japan Laid-open Patent Application Publication No. JP-A-2000-192989

SUMMARY

Technical Problems

As described in PTL 1, the plural grooves are formed on each friction member for reducing drag torque and for lubricating and cooling the friction surface. Further, the grooves penetrate through the friction member from the inner peripheral side to the outer peripheral side. Therefore, in the clutch-on state, operating oil residing on the torus side of the torque converter is supposed to leak through the grooves of the friction members. The amount of operating oil leaking through the grooves (hereinafter referred to as "a leak flow amount") negatively affects the performance of the torque converter.

Now, strict restriction is imposed on the leak flow amount in some transmission specifications. Therefore, a smaller flow-path cross-sectional area is preferable for the grooves of the friction member in terms of reducing the leak flow amount. On the other hand, recent lock-up clutch devices are configured to perform a slip control of causing the friction surface to slip in use. Under such condition, a larger flow-path cross-sectional area is preferable for the grooves in terms of lubricating and cooling the friction surface and in terms of reducing drag torque.

It is an advantage of the present invention to suppress the leak amount in a lock-up clutch device, sufficiently lubricate and cool a friction member, and reduce drag torque, simultaneously.

Solution to Problems

A friction member according to a first invention includes a plurality of friction portions and a plurality of grooves. The plural friction portions are disposed in alignment in a circumferential direction, and form an annular friction surface. The plural grooves are formed between or among the plurality of friction portions, and penetrate therebetween or thereamong from an inner peripheral side to an outer peripheral side. Further, each of the plurality of grooves includes an inner peripheral groove and an outer peripheral groove. The inner peripheral groove is formed in a V-shape opened in the circumferential direction and has: a first groove that is disposed on the inner peripheral side and has an opening bored in an inner peripheral end thereof; and a second groove that is disposed on the outer peripheral side and continues to the first groove. The outer peripheral groove continues to an outer peripheral end of the second groove of the inner peripheral groove and is radially extending in an outer peripheral direction.

Here, the inner peripheral groove, having a V-shape opened in the circumferential direction, is formed on the inner peripheral side. Therefore, oil is easily taken through the opening of the first groove during rotation. Further, the outer peripheral groove is radially formed. Therefore, oil less easily flows inside through the outer peripheral groove during rotation.

Therefore, with use of such friction member for a clutch part of a lock-up clutch device of a torque converter, it is possible to inhibit operating oil from flowing inside from the outside and thereby reduce the leak flow amount in a clutch-on state. Further, it is possible to take a sufficient amount of lubricating oil (operating oil) into the friction surface from the inner peripheral side in a clutch-off state.

A friction member according to a second invention relates to the friction member according to the first invention, and wherein the outer peripheral groove is formed such that a groove center line thereof is positioned within an angular range between positive 20 degrees or less and negative 20 degrees or less with respect to a radial line extending from a center of the friction member.

Similarly to the above, the operating oil can be herein inhibited from flowing inside from the outside.

A friction member according to a third invention relates to the friction member according to the first or second invention, and wherein each of the first groove and the second groove has a circumferential length greater than or equal to 3% of a circumferential length of a radially center part of the friction member.

Here, the first groove and the second groove are relatively elongated. Therefore, a relatively large resistance is produced against the operating oil flowing through a flow path. Therefore, with use of the friction member for the clutch part of the lock-up clutch device of the torque converter, it is possible to suppress the leak flow amount in a clutch-on state.

A clutch plate according to a fourth invention includes an annular core plate; and the friction member according to any of the first to third inventions, which is fixed to at least either of lateral surfaces of the annular core plate.

A clutch device according to a fifth invention is disposed between an input-side rotor and an output-side rotor and includes: the clutch plate recited in the fourth invention as an input-side clutch plate, which is configured to be rotated in synchronization with the input-side rotor; the clutch plate recited in the fourth invention as an output-side clutch plate, which is configured to be rotated in synchronization with the output-side rotor; and an actuation mechanism that is configured to actuate or release press-contact between the input-side clutch plate and the output-side clutch plate. Each of the input-side clutch plate and the output-side clutch plate includes: the annular core plate; and the friction member that is fixed to at least either of the lateral surfaces of the annular core plate. Further, the input-side clutch plate is disposed such that the inner peripheral groove of the friction member is formed in a V-shape opened along a rotational direction. Yet further, the output-side clutch plate is disposed such that the inner peripheral groove of the friction member is formed in a V-shape opened in opposition to the rotational direction.

In a clutch-off state, i.e., when the input-side clutch plate and the output-side clutch plate are separated away from each other, the input-side clutch plate is rotated in synchronization with the input-side rotor. Further, the input-side clutch plate is disposed such that the inner peripheral groove is formed in a V-shape opened along the rotational direction. Therefore, the operating oil is supposed to be taken through the opening of the inner peripheral end by rotation. On the other hand, the output-side clutch plate is not being rotated. However, in conjunction with rotation of the input-side clutch plate, the operating oil flows in the same direction. The operating oil flows into the inner peripheral groove of the output-side clutch plate through the opening formed in the inner peripheral groove.

With the aforementioned configuration, the operating oil smoothly flows into both of the groove of the input-side clutch plate and that of the output-side clutch plate. Therefore, the both clutch plates are reliably separated away from each other, and drag torque can be reduced. Further, it is possible to sufficiently lubricate and cool the friction surfaces of the both clutch plates.

A torque converter according to a sixth invention is the one for transmitting a torque from an input-side rotor to an output-side rotor by a fluid and includes: a front cover to which the torque is inputted from the input-side rotor; an impeller that is fixed to the front cover and forms a fluid chamber together with the front cover; a turbine that is disposed in opposition to the impeller within the fluid chamber; a stator that is disposed between an inner peripheral part of the impeller and an inner peripheral part of the turbine and regulates a flow of the fluid flowing from the turbine to the impeller; and a lock-up clutch device that is disposed axially between the front cover and the turbine and is capable of transmitting and blocking the torque from the front cover to the output-side rotor. The lock-up clutch device includes the clutch device recited in the fifth invention, and the input-side clutch plate is configured to be rotated in synchronization with the front cover whereas the output-side clutch plate is configured to be rotated in synchronization with the turbine.

DETAILED DESCRIPTION OF THE PREFERRED EMBODIMENTS

[Entire Structure]

Figure 1:
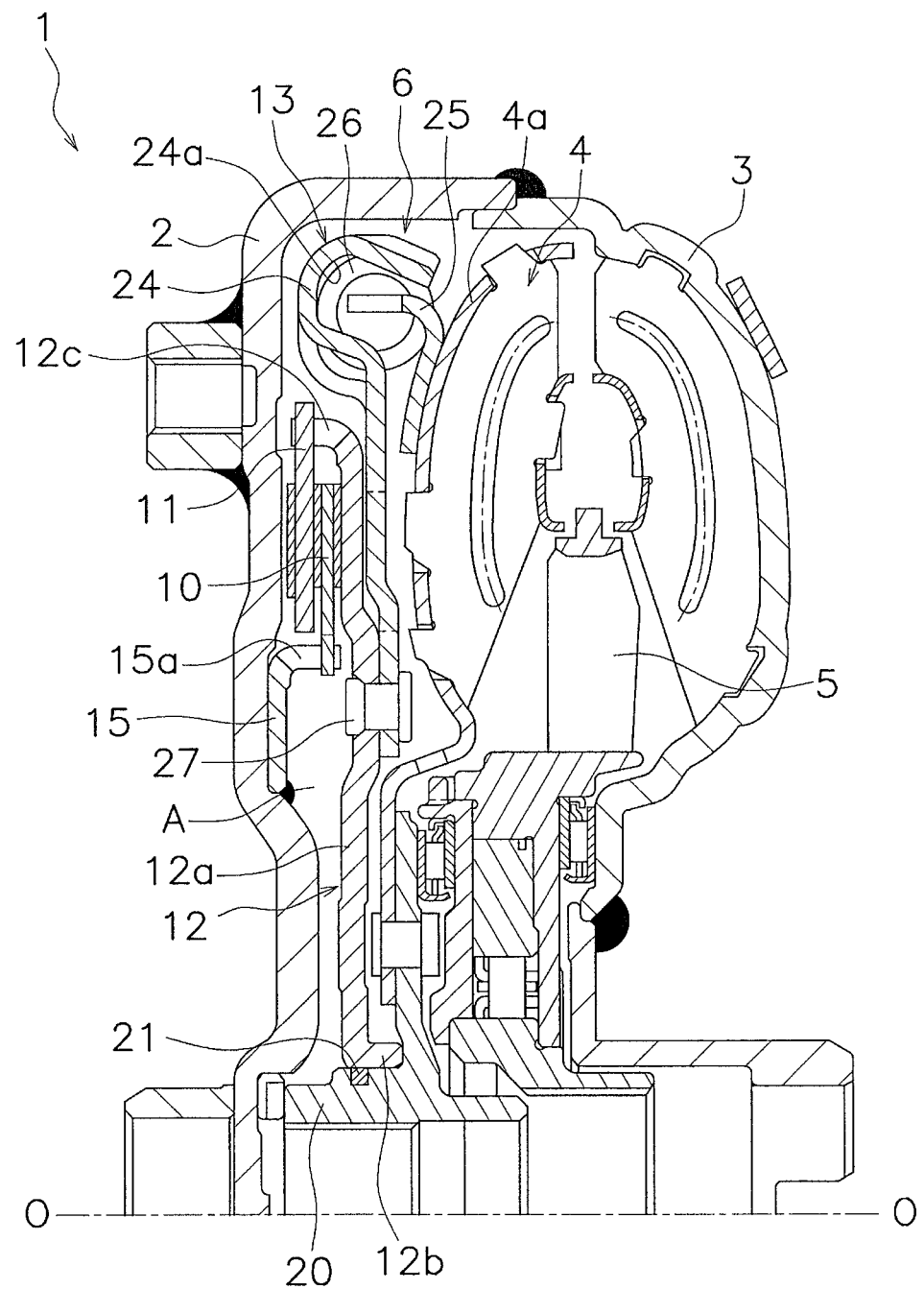
FIG. 1 is a cross-sectional structural view of a torque converter according to an exemplary embodiment of the present invention.

FIG. 1 illustrates a torque converter 1 as an exemplary embodiment of the present invention. A line O-O indicates a rotary axis of the torque converter 1. The torque converter 1 is a device disposed between an engine and a transmission in a vehicle in order to transmit the torque from the engine to the transmission by fluid.

The torque converter 1 includes a front cover 2, an impeller 3, a turbine 4, a stator 5 and a lock-up clutch device 6. The front cover 2 is coupled to a crankshaft of the engine. The impeller 3 is disposed on the transmission side of the front cover 2, and forms a fluid chamber together with the front cover 2. The turbine 4 is disposed in opposition to the impeller 3 within the fluid chamber, and forms a fluid actuation chamber together with the impeller 3. The stator 5 is disposed between the inner peripheral part of the impeller 3 and that of the turbine 4, and regulates the fluid flow from the turbine 4 to the impeller 3. The lock-up clutch device 6 is disposed axially between the front cover 2 and the turbine 4, and is configured to either directly transmit the torque from the front cover 2 towards the turbine 4 or prevent transmission of the torque.

A torque converter main body, including the impeller 3, the turbine 4 and the stator 5, has a structure similar to that of a well-known art. Therefore, the detailed explanation thereof will not be hereinafter made.

[Lock-up Clutch Device]

Detailed explanation will be hereinafter made for the lock-up clutch device 6 including a clutch plate according to the exemplary embodiment of the present invention.

The lock-up clutch device 6 includes an input-side clutch plate 10, an output-side clutch plate 11, a piston 12 and a damper mechanism 13.

The input-side clutch plate 10 is supported by a support member 15 fixed to the front cover 2, while being non-rotatable relatively thereto and axially movable with respect thereto. Specifically, the support member 15 is an annular plate member, and the inner peripheral end portion thereof is fixed to a lateral surface of the front cover 2 by welding. An outer peripheral portion 15a of the support member 15 is bent towards the turbine 4 and is thus formed in a tubular shape. Further, a plurality of grooves are formed on the tubular portion 15a while being extending in the axial direction. On the other hand, a plurality of teeth are formed on the inner peripheral end portion of the input-side clutch plate 10 and are meshed with the grooves formed on the tubular portion 15a. It should be noted that detailed explanation will be made below for the input-side clutch plate 10. With such structure, the input-side clutch plate 10 is rotated in synchronization with the front cover 2 while being movable in the axial direction.

The output-side clutch plate 11 is disposed between the front cover 2 and the input-side clutch plate 10. A plurality of teeth are formed on the outer peripheral end portion of the output-side clutch plate 11. Further, a friction member is fixed to the front cover 2 side surface of the output-side clutch plate 11, whereas no friction member is mounted to the turbine 4 side surface of the output-side clutch plate 11. It should be noted that detailed explanation will be made below for the output-side clutch plate 11.

The piston 12 is a disc-shaped member having a hole in the center part thereof. The piston 12 has: a main body portion 12a; an inner peripheral tubular portion 12b formed by bending the inner peripheral part of the main body portion 12a towards the transmission; and an outer peripheral tubular portion 12c formed by bending the outer peripheral part of the main body portion 12a towards the engine.

The main body portion 12a is disposed in opposition to the front cover 2. The inner peripheral tubular portion 12b is supported while being axially movable with respect to a turbine hub 20 connected to the inner peripheral end portion of the turbine 4. A seal member 21 is mounted to the outer peripheral surface of the turbine hub 20, and seals between the inner peripheral tubular portion 12b of the piston 12 and the turbine hub 20. Further, a plurality of grooves are formed on the outer peripheral tubular portion 12c while being extending in the axial direction. The plural grooves are meshed with the plural teeth formed on the output-side clutch plate 11. Accordingly, the output-side clutch plate 11 is rotated in synchronization with the piston 12 while being movable in the axial direction.

The damper mechanism 13 includes a drive plate 24, a driven plate 25 and torsion springs 26 disposed therebetween. The drive plate 24 is an annular member, and the inner peripheral end portion thereof is fixed to the main body portion 12a of the piston 12 by rivets 27. Further, accommodation portions 24a are formed in the outer peripheral part of the drive plate 24 in order to accommodate the torsion springs 26 and support the both ends of the respective torsion springs 26. The driven plate 25 is fixed to the front cover 2 side surface of a turbine shell 4a composing the turbine 4. The outer peripheral end portion of the driven plate 25 is bent towards the front cover 2, and the tip ends thereof are engaged with the ends of the torsion springs 26.

[Clutch Plate]

Figure 2:
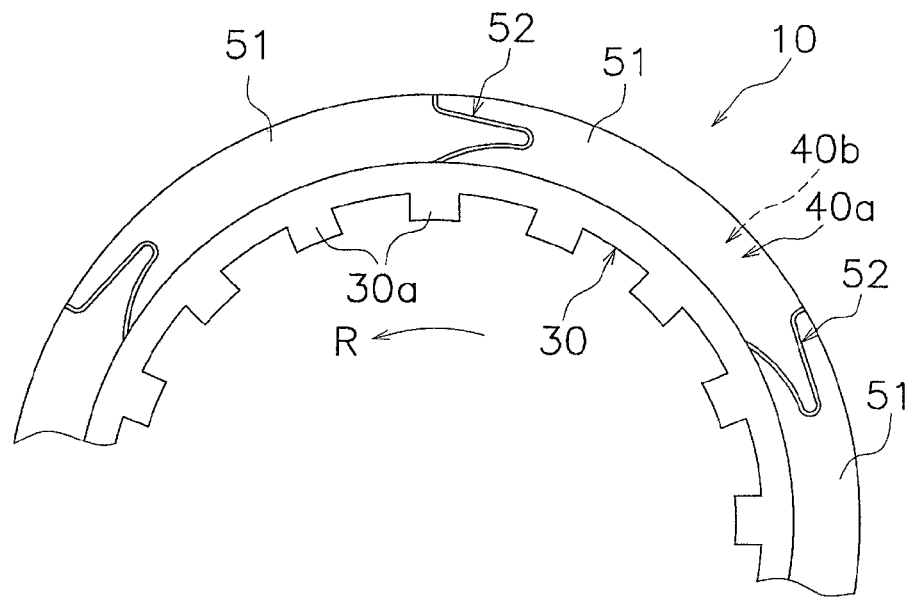
FIG. 2 is a partial front view of an input-side clutch plate according to the exemplary embodiment of the present invention.
Figure 3:
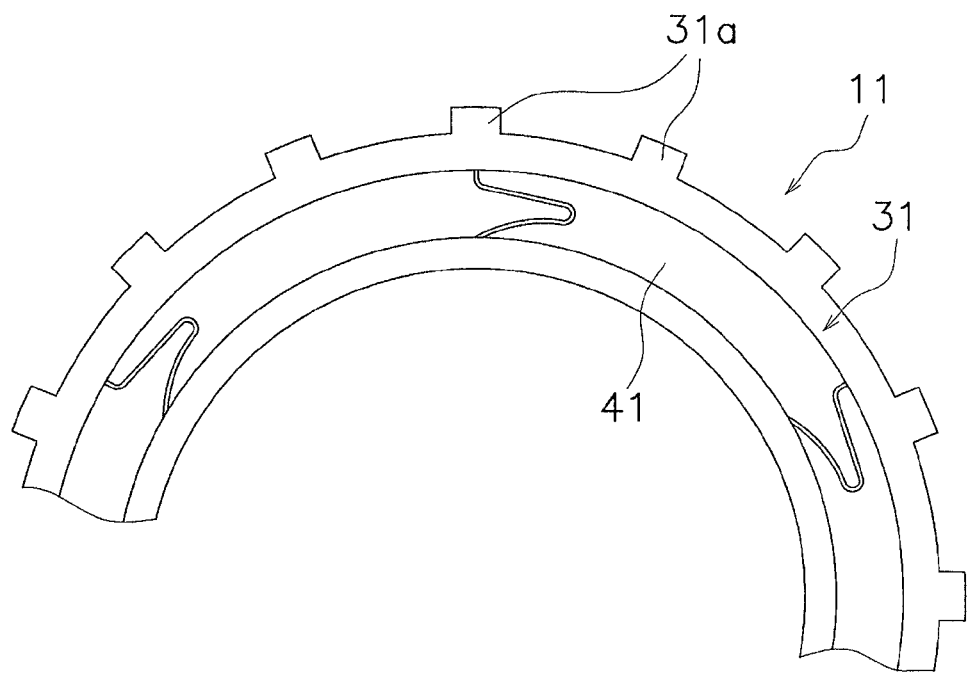
FIG. 3 is a partial front view of an output-side clutch plate according to the exemplary embodiment of the present invention.

The basic structure of the input-side clutch plate 10 and that of the output-side clutch plate 11 are the same. In other words, as illustrated in FIGS. 1, 2 and 3, the both clutch plates 10 and 11 include a core plate (30, 31) and friction members/member (40a and 40b, 41) fixed to the core plate (30, 31). Specifically, as illustrated in the partial enlarged view of FIG. 2, the input-side clutch plate 10 includes: the core plate 30 that a plurality of teeth 30a are formed on the inner peripheral end thereof; and the friction members 40a and 40b are fixed to the both surfaces of the core plate 30 (only the friction member 40a fixed to the front surface appears in in FIG. 2). On the other hand, as illustrated in FIG. 3, the output-side clutch plate 11 includes: the core plate 31 that a plurality of teeth 31a are formed on the outer peripheral part thereof; and the friction member 41 fixed to only the front cover 2 side surface of the core plate 31.

[Friction Member]

The friction member 40a, fixed to the turbine-4 side of the input-side clutch plate 10, is formed in a continuous annular shape. The friction member 40a has: a plurality of friction portions 51 forming an annular friction surface; and a plurality of grooves 52 formed among the friction portions 51. In this example, the plural friction portions 51 are joined through the bottom parts of the grooves 52, and the plural friction portions 51 and the plural grooves 52 are integrally formed by stamping. It should be noted that in the example illustrated in FIG. 2, the input-side clutch plate 10 having the friction member 40a is rotated in a direction of an arrow R depicted in FIG. 2.

Figure 4:
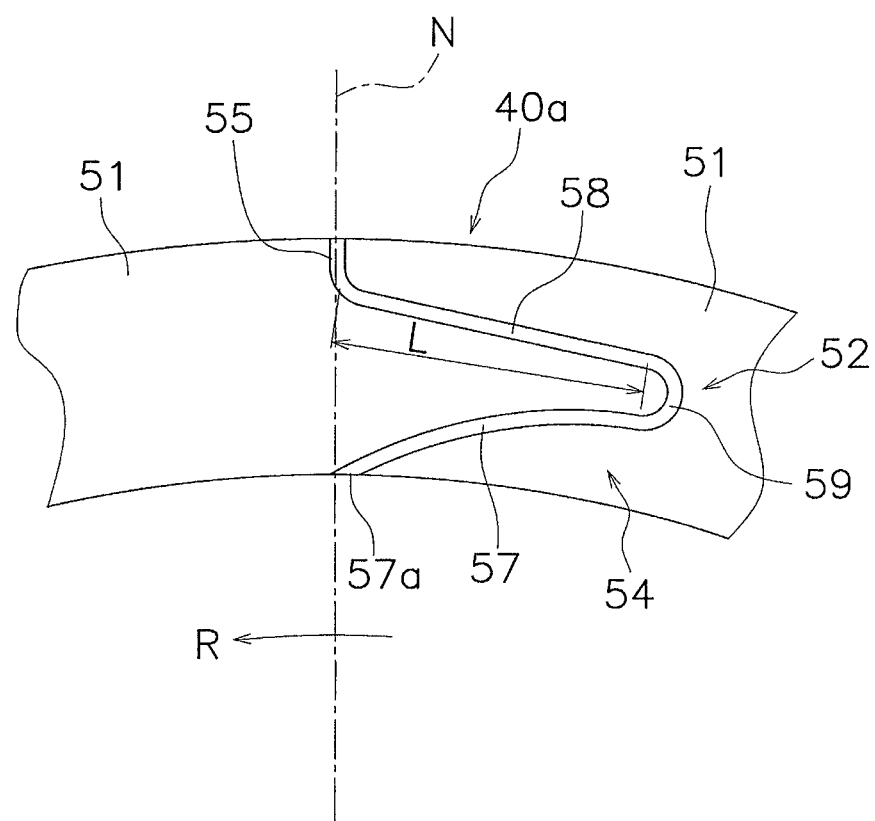
FIG. 4 is a partial enlarged view of a friction member.

FIG. 4 illustrates an enlarged view of one of the grooves 52. Each groove 52 includes: an inner peripheral groove 54 formed on the inner peripheral side; and an outer peripheral groove 55 formed continuously to the inner peripheral groove 54 on the outer peripheral side.

The inner peripheral groove 54 includes: a first groove 57 and a second groove 58 that form a V-shape opened along the rotational direction; and a folded-back groove 59 formed between the grooves 57 and 58. The first groove 57 has an opening 57a on the inner peripheral end thereof and is extending from the opening 57a in a direction opposite to the rotational direction R. The second groove 58 is formed continuously to the first groove 57 while being extending on the outer peripheral side of the first groove 57 along the rotational direction. The folded-back groove 59 is curvedly formed between the first groove 57 and the second groove 58. Further, it is preferable to set the circumferential length L (see FIG. 4) of each of the first and second grooves 57 and 58 to be 3% or greater of the circumferential length of the radially center part of the friction member 40a. This is intended to further reduce the leak amount by increasing the flow path resistance against the fluid flowing through the grooves 57 and 58.

The outer peripheral groove 55 is formed continuously to the outer peripheral end of the second groove 58, while being radially extending in the outer peripheral direction. Specifically, as illustrated in FIG. 4, the outer peripheral groove 55 is formed such that the groove center line thereof is matched with a line N radially extending from the center of the friction member 40a. It should be noted that the outer peripheral groove 55 is preferably formed in a position within an angular range between positive 20 degrees or less and negative 20 degree or less with respect to the line N.

Further, the friction member 41 fixed to the output-side clutch plate 11 also has a groove shape, and is formed in completely the same shape as the friction member 40a of the input-side clutch plate 10. On the other hand, the friction member 40b, fixed to the front-cover-2 side of the input-side clutch plate 10, is different from the other friction members 40a and 41 only in the groove direction (the opened direction of the V-shape), but the other elements thereof are the same as those of the other friction members 40a and 41.

The friction members 40a and 40b as described above are fixed to the input-side clutch plate 10, whereas the friction member 41 is fixed to the output-side clutch plate 11. In other words, the friction members 40a and 40b are fixed to the both surfaces of the input-side clutch plate 10 such that each inner peripheral groove 54 can be positioned in a V-shape opened along the rotational direction. On the other hand, the friction member 41 is fixed to the front cover 2 side surface of the output-side clutch plate 11 such that each inner peripheral groove 54 can be positioned in a V-shape opened in opposition to the rotational direction.

[Action]

At a low vehicle speed, for instance, when the vehicle is started moving, the lock-up clutch device 6 is turned off (transmission of torque is blocked) for transmitting the torque from the engine to the transmission through the fluid. In this case, the operating oil is supplied to a space A (see FIG. 1) produced between the front cover 2 and the piston 12 by a control valve (not illustrated in the figures), and the hydraulic pressure in the space A is controlled to be higher than that in the space produced on the turbine 4 side of the piston 12. Therefore, the piston 12 is moved towards the transmission, and the input-side clutch plate 10 and the output-side clutch plate 11 are separated from the front cover 2. Thus, a clutch-off state is produced. Therefore, the torque from the front cover 2 is transmitted to the transmission through the torque converter main body without through the lock-up clutch device 6.

On the other hand, when the vehicle speed is increased to some extent, the operating oil is drained from the space A produced between the front cover 2 and the piston 12. In this case, the hydraulic pressure in the space A becomes lower than that in the space produced on the turbine 4 side of the piston 12. Therefore, the piston 12 is moved towards the front cover 2. Accordingly, the input-side clutch plate 10 and the output-side clutch plate 11 are interposed and held between the front cover 2 and the piston 12. Thus, a clutch-on state is produced. Therefore, the torque from the front cover 2 is directly transmitted to the transmission through the lock-up clutch device 6.

In the course of action as described above, the operating oil is going to flow into the both clutch plates 10 and 11 from the outer peripheral side in the clutch-on state. However, the outer peripheral grooves 55 of the both clutch plates 10 and 11 are radially formed. Therefore, the operating oil less easily flows into the outer peripheral grooves 55. Further, even when flowing into the outer peripheral grooves 55, the operating oil less easily flows towards the inner periphery, because the circumferential lengths of the first grooves 57 and the second grooves 58 are relatively long and large flow path resistance is produced in the both grooves 57 and 58. Due to the reasons, the flow amount of the operating oil is reduced when the operating oil flows from the outer peripheral side to the inner peripheral side of the both clutch plates 10 and 11 while passing through the grooves 52 of the friction members 40a, 40b and 41. In other words, the leak flow amount is reduced.

By contrast, the operating oil flows from the inner peripheral side to the outer peripheral side of the both clutch plates 10 and 11 in the clutch-off state. Further, the input-side clutch plate 10 is rotated in synchronization with the front cover 2 at the same rotation speed as the engine. Yet further, the output-side clutch plate 11 is either stopped or rotated at a rotation speed less than that of the input-side clutch plate 10.

In such state, the operating oil is taken in through the openings 57a formed on the inner peripheral ends of the inner peripheral grooves 54 as if it were sucked into the openings 57a, because the inner peripheral grooves 54, formed on the friction members 40a and 40b mounted to the both surfaces of the input-side clutch plate 10, are opened along the rotational direction. Further, the operating oil, flowing in accordance with the rotation of the input-side clutch plate 10, is supposed to flow into the inner peripheral end openings of the friction member 41 of the output-side clutch plate 11. Therefore, the operating oil is sufficiently supplied to the grooves 52 of the friction members 40a, 40b and 41 of the both clutch plates 10 and 11. Therefore, the friction surfaces of the both clutch plates 10 and 11 can be sufficiently lubricated and cooled. Further, drag torque can be suppressed low.

Other Exemplary Embodiments

The present invention is not limited to the exemplary embodiment as described above, and a variety of changes or modifications can be made without departing from the scope of the present invention.

For example, in the aforementioned exemplary embodiment, the friction members are integrally formed. However, the present invention can be also similarly applied to a segment-type friction member composed of a plurality of friction parts separately formed.

INDUSTRIAL APPLICABILITY

According to the friction member of the present invention as described above, it is possible simultaneously to suppress the leak flow amount in the lock-up clutch device, sufficiently lubricate and cool the friction member, and reduce drag torque.

Advantageous Effects of Invention

According to the friction member of the present invention as described above, it is possible to suppress the leak flow amount in the lock-up clutch device, sufficiently lubricate and cool the friction member, and reduce drag torque, simultaneously.

The invention claimed is:
1. A friction member of an input plate being configured to transmit torque to an output plate, the friction member comprising:
first and second friction portions being disposed on the input plate and aligned in a circumferential direction of the input plate, the first and second friction portions forming an annular friction surface, the input plate including inner and outer peripheral sides; and
a separate groove being formed between the first and second friction portions, the groove penetrating between the inner peripheral side and the outer peripheral side, the groove including
an inner peripheral groove being formed in a V-shape, the inner peripheral groove having a first groove being disposed on the inner peripheral side and extending to the inner peripheral end, a second groove being disposed on the outer peripheral side, and a curved groove connecting the first and second grooves; and
an outer peripheral groove continuing to an outer peripheral end of the second groove of the inner peripheral groove, the outer peripheral groove radially extending in an outer peripheral direction, the outer peripheral groove forming a non-zero angle with the outer peripheral end of the second groove, the outer peripheral groove forming a first angle with the outer peripheral side and the first groove forming a second angle with the inner peripheral side, the first angle being different from the second angle, the first angle, the second angle and the outer peripheral groove being formed in the same circumferential direction from the curved groove,
each of the first groove and the second groove having a circumferential length greater than or equal to 3% of a circumferential length of a radially center part of the friction member.

2. A clutch plate comprising:
an annular core plate; and
the friction member recited in claim 1, wherein
the friction member is fixed to at least either of lateral surfaces of the annular core plate.

3. A clutch device disposed between an input-side rotor and an output-side rotor, comprising:
the clutch plate recited in claim 2 as the input plate being configured to be rotated in synchronization with the input-side rotor;
another clutch plate recited in claim 2 as the output plate being configured to be rotated in synchronization with the output-side rotor; and
an actuation mechanism being configured to actuate or release press-contact between the input-side clutch plate and the output-side clutch plate, wherein
each of the input-side clutch plate and the output-side clutch plate includes the annular core plate, and the friction member being fixed to at least either of the lateral surfaces of the annular core plate,
the input plate is disposed such that the inner peripheral groove of the friction member is formed in a V-shape, and
the output plate is disposed such that the inner peripheral groove of the friction member is formed in a V-shape.

4. A torque converter for transmitting a torque from an input-side rotor to an output-side rotor by fluid, the torque converter comprising:
a front cover to which the torque is inputted from the input-side rotor;
an impeller being fixed to the front cover, the impeller forming a fluid chamber together with the front cover;
a turbine being disposed opposite to the impeller within the fluid chamber;
a stator being disposed between an inner peripheral part of the impeller and an inner peripheral part of the turbine, the stator being configured to regulate a flow of the fluid flowing from the turbine to the impeller; and
a lock-up clutch device being disposed axially between the front cover and the turbine, the lock-up clutch device being configured to transmit and block the torque from the front cover to the output-side rotor,
the lock-up clutch device includes the clutch device recited in claim 3, and the input plate is configured to be rotated in synchronization with the front cover whereas the output plate is configured to be rotated in synchronization with the turbine.

* * * * *